United States Patent [19]

Muschelknautz

[11] 4,203,289
[45] May 20, 1980

[54] HYDRODYNAMIC CONTROL COUPLING

[75] Inventor: Horst Muschelknautz, Crailsheim, Fed. Rep. of Germany

[73] Assignee: Voith Turbo GmbH & Co., KG., Crailsheim, Fed. Rep. of Germany

[21] Appl. No.: 953,037

[22] Filed: Oct. 20, 1978

[30] Foreign Application Priority Data

Oct. 28, 1977 [DE] Fed. Rep. of Germany ....... 2748386

[51] Int. Cl.² .............................................. F16D 33/06
[52] U.S. Cl. ........................................ 60/358; 60/494; 137/101
[58] Field of Search ................. 60/330, 347, 352, 357, 60/358, 359, 494; 137/101, 118, 288; 251/324

[56] References Cited

U.S. PATENT DOCUMENTS

2,956,577   10/1960   Kirkham ............................... 137/101

FOREIGN PATENT DOCUMENTS

1450223   9/1970   Fed. Rep. of Germany .
1073412   6/1967   United Kingdom .
1154204   6/1969   United Kingdom .

*Primary Examiner*—Edgar W. Geoghegan
*Attorney, Agent, or Firm*—Ostrolenk, Faber, Gerb & Soffen

[57] ABSTRACT

A hydrodynamic control coupling having a toroidal working chamber defined by a primary bladed wheel connected with a driving motor and a secondary bladed wheel connected to the driven element; a draining device for draining working fluid from the working chamber; a filling pump supplies working fluid to the working chamber; a valve varies the filling flow to the working chamber; the valve is a flow divider comprised of two interconnected valves including respective valve elements mounted in tandem on a common shaft which is shiftable axially; each of the interconnected valves includes a respective valve seat; as one valve element is moved away from its valve seat; the other valve element is simultaneously moved toward its valve seat; at least one of the valve elements and its seat is tapered to an acute cone angle, with other conically tapered shapes also being disclosed for one or both of the valve element and/or valve seat; one valve chamber supplies working fluid to the working chamber; the other valve chamber delivers the working fluid outside the working chamber.

14 Claims, 4 Drawing Figures

HYDRODYNAMIC CONTROL COUPLING

This invention relates to a hydrodynamic control coupling of the kind comprising a primary bladed wheel and a secondary bladed wheel which together form a toroidal shaped, fluid filled working chamber. The degree to which the working chamber might be filled can be varied. There is a draining device for draining working fluid from the working chamber to an area outside the coupling. A filling pump, and preferably a positive displacement pump, supplies hydraulic or working fluid, such as oil to the working chamber. The pump delivers working fluid into a collecting trough which is connected with the working chamber and revolves with the primary bladed wheel. In addition, the pump has a valve arrangement for varying the filling flow.

Couplings of this type are valuable for the drives for heavy machinery, such as large pumps, ship's propellers, impact crushers, and the like. When the working chamber is empty of fluid, the machine connected to the coupling can be run up without a load. Controlled acceleration or run up of the machine is made possible through gradual filling of the working chamber of the coupling. In addition, by varying the rate at which the working chamber is filled, smooth adjustment of the rotary speed of the machine and/or restriction of the amount of torque being transmitted through the coupling during operation can be achieved.

During the operation of the coupling, working fluid is constantly being transferred from inside the working chamber to the outside. The rate of transfer of the working fluid remains generally constant, which is unlike other control couplings, like ones which have an adjustable scooping tube, for example.

Because working fluid constantly flows through the coupling, if cooled working fluid is being supplied, the coupling can be subjected to high specific loads.

Couplings of this kind can also be used for smaller and medium range force transmissions, for driving pumps, fans and the like. Besides providing control over running-up of the machine, the ability to adjust the rotary speed of the machine is of prime importance.

In one known hydrodynamic control coupling (see the publication Voith, "Hydrodynamische Getriebe, Kupplungen, Bremsen", Krausskopf-Verlad 1970, pages 254 to 259, especially Figure 5.34), the valve arrangement used to vary the rate of filling of the working chamber of the coupling is constructed as a slide valve with a strong throttling effect. A throttling effect of this kind unavoidably produces a loss of output. This can perhaps be tolerated in drives for producing relatively small outputs (up to about 100 kw), but not, however, in the drives for heavy machinery.

For this reason, in another known hydrodynamic control coupling (see the publication Voith "Entleerbare Voith-Turbokupplungen" CR 112, especially page 9) which is intended for driving heavy machinery with large outputs (up to about 10,000 kw), the control valve is omitted altogether. Instead, to control running-up in this instance, provision is made for the filling pump, which is controlled by a motor-current measuring device, to be switched off and on several times. Alternatively, by alternately opening and closing switching valves during the running-up process, the filling flow can be conducted for part of the time to the coupling and for another part of the time, it can be conducted back into a container. The fluid returned to the container is extracted by the filling pump. Both of these embodiments have the disadvantage that the torque transmitted (or the rotational speed) is erratic during the starting-up process and follows a "zig-zag curve".

Although it is possible to achieve a smooth curve for the torque or the rotational speed by using a filling pump with a variable delivery, such pumps are expensive and they are also more susceptible to failure than pumps with a constant delivery.

SUMMARY OF THE INVENTION

An object of the invention is to provide a hydrodynamic control coupling, wherein the amount of torque transmitted by the coupling can be varied continuously and with minimum loss of output.

It is another object of the invention to provide such a coupling, in which the working chamber can be filled to a level that may be varied by varying the filling flow of working fluid.

It is a further object of the invention to realize the foregoing objects with a constant delivery pump.

A hydrodynamic control coupling according to this invention has a valve arrangement that is a known type of flow divider comprising two interconnected valves which can be adjusted by valve element movement in opposite directions. At least one among the valve element and the valve seat of each interconnected valve has a generally tapered shaped that at least approximates an acute cone. The flow divider supplies a part of the flow of working fluid that has been delivered by the filling pump to a collecting trough leading to the working chamber and a part of the working fluid to a reservoir or container, which may communicate with and thus recycle fluid to the suction side of the filling pump. The specially shaped flow divider minimizes any throttling effect and the loss of output associated with it.

In one embodiment of the invention, a flow divider of the type shown in British Patent Specification No. 1,073,412 is used. It has two interconnected valves which can be displaced in opposite directions. In each of the two valves at least one among the valve element and the valve seat is tapered to the approximate shape of an acute cone. The filling flow is divided into two branch streams, with some of the filling flow being delivered by the filling pump to a collecting trough and from there to the working chamber of the coupling and some of the flow to the suction side of the filling pump.

Due to the acute conical tapering of the valve element, the adjustment path of the two valves is very long, so that the quantitative relationship between the two branch streams can be varied very accurately within wide limits. It is also significant that in such a flow divider valve, the flow forces acting on the two movable valve elements is largely equalized, so that the effective displacement force required is very small.

Both the fluid supplied to the working chamber of the coupling via the collecting trough and the fluid conducted back to the suction side of the filling pump or into a storage reservoir emerge in a pressure free zone. This is because no over-pressure prevails in the annular collecting trough which empties into the working chamber or on the suction side of the filling pump or in the storage reservoir. This means that there is no valve movement counteraction by counter-pressure from either of these two zones.

By this means and due to the circumstances already mentioned, at least one of the elements of the flow divider (i.e. the valve element or the valve seat), has a generally acute conical shape. Because of the shaping of the flow divider valve and the pressure characteristics just mentioned, the flow divider characteristic curve of through flow as a function of valve displacement is linear or very nearly linear. This means that the amount of working fluid that is supplied to the coupling per unit of time is a linear function of the displacement of the valve in the flow divider. This considerably simplifies the construction of an entire running up control device or of a regulating device for holding the torque or the rotational speed constant. If the two pipes leading from the flow divider to the coupling and to the storage container are of unequal lengths, then the resulting deviation from the linear path of the characteristic curve can be equalized by providing a resistance to flow in the shorter line so that the linear characteristic curve can thereby be restored.

Preferably, the filling pump used with the invention is of the positive displacement type, since the delivery of fluid by this type of pump is practically constant, assuming a constant rotary drive speed. Generally, for safety reasons, an over-pressure valve must be connected to the pressure line of such a positive displacement pump. However, because the two valves of the flow divider according to the invention are positively interlinked and both can only be displaced together in opposite directions, the pressure line of the filling pump can never be completely shut. Consequently, in an arrangement in accordance with the invention, the over-pressure valve can be dispensed with.

In the valves of the flow divider used in accordance with the invention, either the movable valve elements only or the valve seats only may be tapered approximately to an acute cone. However, a third version is preferred, wherein both the valve elements of both valves in the flow divider and the valve seats of both valves are tapered approximately to an acute cone in the same direction. By this means, an elongated gap in the form of a conical shell is created in a known way between the two valve elements. This gap is well-suited to varying the flow of fluid with minimum loss. However, with a gap of this kind, there is a danger that a laminar flow may develop in the valve, so that the characteristic curve of valve through flow as a function of valve displacement changes when the viscosity of the working fluid, particularly oil, changes. This is especially so in the case where the temperature varies. An important further development of the invention therefore comprises generating turbulence in front of the elongated conical shell-shaped gap, preferably by an angular deflection of the working fluid as it passes through the valves of the flow divider. A 90° deflection has proved to be particularly effective. In this connection, it is important to dimension the flow cross-section so that the turbulence is produced at a relatively low flow speed. This makes it possible to keep the energy loss in the valves of the flow divider to a minimum, while still maintaining the characteristic curve of the valve unchanged when there are variations in temperature and viscosity.

Under certain circumstances, the valves of the flow divider may be designed so that the characteristic curve of each valve is deliberately made to deviate from a linear curve. This may be desirable if the natural characteristic curves of the hydrodynamic coupling, i.e. torque as a function of slip at various filling levels, are difficult to control. A non-linear characteristic curve may be obtained by installing a flow resistance, such as a screen, for instance, in the filling line leading to the coupling. However, this would again result in a loss of energy. Preferably, therefore, provision is made for one of the elements of the valves, i.e. the valve element or the valve seat in the flow divider to have a parabolic shape, when viewed in longitudinal section.

BRIEF DESCRIPTION OF THE DRAWINGS

Other objects and features of a hydrodynamic control coupling according to the invention, including various forms of flow divider valves therefor will be apparent from the following description viewed with reference to the accompanying drawings in which.

DESCRIPTION OF PREFERRED EMBODIMENTS

Figure 1:
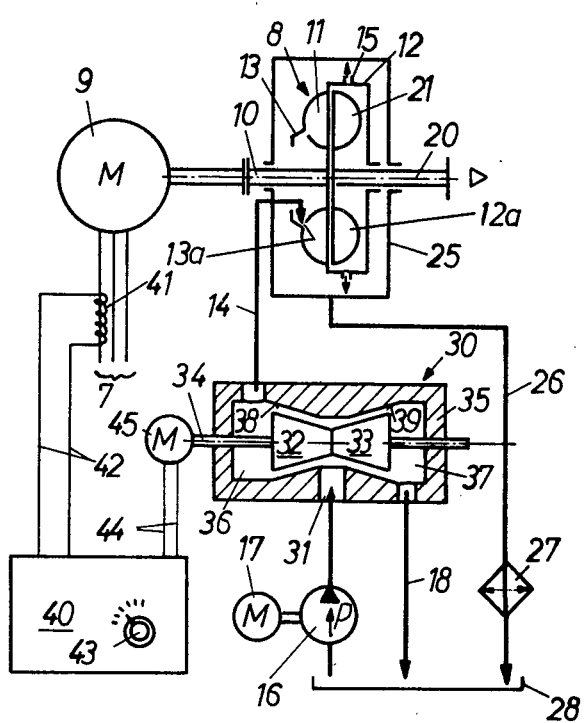
FIG. 1 schematically shows a hydrodynamic control coupling according to the invention, with one form of flow divider valve disposed in a filling line.

Referring to FIG. 1, the hydrodynamic coupling 8 includes a primary shaft 10 which is linked to the drive shaft of an electric motor 9. A primary bladed or bucket or pump wheel 11, with a coupling shell 12 is supported on the shaft 10. There is also a secondary shaft 20, and a secondary bladed or bucket or turbine wheel 21 is supported on shaft 20. The two bladed wheels 11, 21 form a toroidal working chamber 12a.

A hydraulic fluid collecting trough 13 is disposed on the rear face of the primary bladed wheel 11, for supplying hyraulic fluid to the working chamber 12a. The trough is connected via holes 13a with the working chamber of the coupling. A filling line 14 has an outlet into the collecting trough 13. Several spray holes 15 are defined in the periphery of the coupling shell for effecting continuous removal of working fluid from the working chamber under centrifugal force as coupling shell 12 revolves with the primary bladed wheel 11. The whole hydrodynamic coupling 8 is surrounded by a stationary housing 25. This collects the sprayed out hydraulic fluid, which then flows into a storage container 28 via a return line 26 and a cooler 27.

The supply of hydraulic fluid is effected by a pump 16, which draws fluid from the storage container 28. The pump 16 is connected on the pressure side with the inlet 31 of the flow divider valve 30. The pump 16 is preferably a positive displacement pump with a constant volume delivery, and the pump is driven by a motor 17 which operates at a constant rotary speed.

The flow divider valve 30 has two symmetrically arranged, interlinked, truncated cone-shaped valve elements 32 and 33 which meet at their narrow ends, but the reverse orientation can also be used. The cone angle of each valve element is acute, about 10° to 30°. The two valve elements 32 and 33 are arranged in tandem on an adjustment rod 34 which can be displaced in an axial direction in a valve housing 35.

The housing 35 of the flow divider valve 30 includes two outlet chambers 36 or 37 each at the respective outer end of the housing 35. The inner volumes of the outlet chambers of the housing 35 taper narrower toward the center, again in a symmetrical arrangement. The housing 35 thus forms two acute conical valve seats 38 and 39. These each form a conical shell-shaped gap with the two movable valve elements 32 and 33. In the central zone of the inner volume of the housing, the inlet 31 enters the housing 35 in a direction perpendicular to the valve axis. The stream which enters the housing is, therefore, deflected initially through about 90°. The filling line 14 leading to the chamber 8 is connected to the outlet chamber 36. A line 18 leading back to the storage container 28 is connected to the outlet chamber 37.

In FIG. 1, the adjustment rod 34 and the valve elements 32 and 33 are shown in their central position. The two gap cross-sections of the chambers are the same in this case, so that the stream of fluid supplied by the pump 16 is divided into two equal halves, one of which flows through the filling line 14 to the trough 13 of the coupling 8 and the other of which flows back to the storage container 28 through the line 18. Under these conditions, a specific level of filling is established in the working chamber 12a of the hydrodynamic coupling 8. This establishes the level of the torque, which the machine to be driven (not shown in the Figure) requires from the secondary shaft 20 and gives it a specific secondary rotational speed. It is assumed here that the primary rotational speed of the primary shaft 10 remains at least approximately constant.

If the adjustment rod 34 with the two closing elements 32 and 33 is moved to the left, for example, as viewed in FIG. 1, then the stream of fluid which arrives in the coupling 8 through the line 14 is greater. The filling level in the working chamber 12a of the coupling increases. Consequently, while the torque remains unchanged, the secondary rotational speed increases. Displacement of the adjustment rod 34 toward the right produces the opposite effect.

To enable the hydrodynamic coupling 8 to restrict the amount of torque to a certain level during the running-up process, i.e. when accelerating the machine from a standstill, and/or during operation, a control device 40 is provided. A measuring coil 41 for measuring the strength of the electrical current is provided in the current supply to the electrical drive motor 9. This is an indication of the torque being transmitted by the hydrodynamic coupling and is supplied as a measured value through the lines 42 to the control device 40. The measured value is compared there with a supply value which can be set, for example, by means of a rotating knob 43. If the measured value differs from the supply value, the control device 40 actuates an adjustment motor 45 via control lines 44. This displaces the adjustment rod 34 of the flow divider valve 30 in a direction which makes the torque transmitted by the coupling 8 correspond to the supply value.

In conjunction with the other control devices, the hydrodynamic coupling according to the invention can also be used to maintain a constant rate of acceleration when running up, or to hold the secondary rotational speed of the hydrodynamic coupling 8 constant during operation.

In FIG. 1 both the closing elements 32 and 33 and also the valve seats 38 and 39 in the flow divider valve 30 have an acute conical shape.

Figure 2:
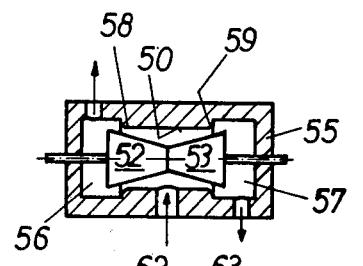
FIGS. 2–4 show various alternatives to the flow divider valves for being included in the coupling of FIG. 1.

Referring to FIG. 2, the flow divider valve shown differs from that shown in FIG. 1, in that only the two valve elements 52 and 53 have a conical shape. The valve housing 55 again has respective outlet chambers 56 and 57 at each of its two ends. The inner volume of the housing is defined in its central zone by a cylindrical bore 50. The ends of the bore 50 are rounded off to form the valve seats 58 and 59 that receive the valve elements 52 and 53.

Figure 3:
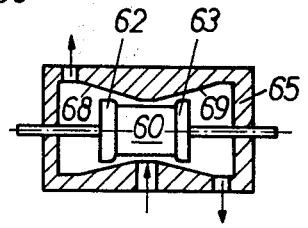

In the form shown in FIG. 3, the flow divider valve has conically shaped valve seats 68 and 69, which are provided in the valve housing 65 and are similar to the valve seats 38, 39 in FIG. 1. However, the two valve elements 62 and 63 are formed by two collars at the ends of a spool-type and otherwise substantially cylindrical element 60.

The flow divider valves shown in FIGS. 2 and 3 may produce a somewhat higher pressure loss than the valve shown in FIG. 1 because the flow in the gaps between the valve elements 52 and 53 or 62 and 63 and the valve seats 58, 59 or 68, 69, respectively, is less well-conducted than in the conical shell-shaped gap in the form according to FIG. 1. However, production of these forms is somewhat cheaper since fewer conical surfaces have to be machined.

Figure 4:
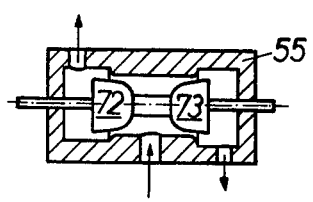

The flow divider valve shown in FIG. 4 has a non-linear characteristic curve. The valve housing 55 in FIG. 4 has the exact form as the housing shown in FIG. 2. However, the contour of each of the valve elements 72 and 73 is somewhat conical (e.g. as a parabola), viewed in longitudinal section. The rate at which the valve elements taper narrower can increase toward the center of the flow divider valve, as shown in FIG. 4. However, the shape of the valve elements can alternatively be such that the taper reduces toward the center of the valve.

As can be seen from FIGS. 2 and 4, the greatest diameter of the valve elements 52 and 53 or 72 and 73 can be made slightly smaller throughout than the diameter of the center bore 50 in the valve housing 55. The dimensions in these cases can be such that when a valve half is in the closed condition, a gap 0.5 mm wide, for example, remains between the valve element and the valve housing. This ensures with an even higher degree of reliability that the dirt particles which are sometimes found in the hydraulic fluid do not remain trapped in the flow divider valve. In addition, the two closing elements 52 and 53 or 72 and 73 can form a one-part component, which simplifies manufacture. The above mentioned advantages can also be achieved with the embodiments shown in FIG. 1 or 3, by making the greatest diameter of the valve elements 32 and 33 or 62 and 63 slightly smaller than the smallest diameter of the conical valve seats 38 and 39 or 68 and 69, respectively. This slightly differs from the forms of the valves shown in FIGS. 1 and 3.

Although the present invention has been described in connection with a plurality of preferred embodiments thereof, many variations and modifications will now become apparent to those skilled in the art. It is preferred, therefore, that the present invention be limited not by the specific disclosure herein, but only by the appended claims.

What is claimed is:

1. A hydrodynamic coupling, comprising:
 a primary bladed wheel; a secondary bladed wheel, which together with said primary wheel defines a toroidal working chamber; a draining device for draining working fluid from said working chamber;
 a filling pump for supplying working fluid to said working chamber;
 a valve between said filling pump and said working chamber for varying the filling flow to said working chamber; said valve being a flow divider type valve, and comprising:

two interconnected valve means, each comprising a valve chamber with a valve seat defined in it and a valve element relatively movable in said valve chamber between a position on and off its respective said valve seat;

both said valve means being arranged and connected such that, as one said valve element shifts off its respective said valve seat for allowing greater flow through its said valve chamber, the other said valve element shifts toward its respective said valve seat for reducing the flow through its said valve chamber; in each said valve means, at least one of said valve element and said valve seat tapers narrower in shape; one said valve means chamber having an outlet communicating with said working chamber and the other said valve means chamber having an outlet communicating elsewhere than with said working chamber.

2. The hydrodynamic coupling of claim 1, wherein said filling pump is a positive displacement pump.

3. The hydrodynamic coupling of claim 1, wherein the one of said valve element and said valve seat that tapers is tapered at least approximately to an acute cone.

4. The hydrodynamic coupling of claim 3, wherein said valve element has a greatest diameter end and the diameter of that said end is slightly smaller than the diameter of the bore of said valve chamber.

5. The hydrodynamic coupling of claim 3, wherein said valve has an inlet from said filling pump; said valve inlet being placed to cause fluid to enter said valve chambers transversely to the axes of said valve chambers and transversely to the axes of said valve seats; said valve inlet being so placed as to be between said valve seats, whereby fluid entering said valve is angularly deflected to pass through said valve chambers.

6. The hydrodynamic coupling of any of claims 1, 3, or 5, further comprising a collecting trough communicating into said working chamber and connected with said primary bladed wheel for rotating therewith; said filling pump delivering fluid to said working chamber by delivering the fluid to said collecting trough.

7. The hydrodynamic coupling of either of claims 3 or 5, wherein said valve chambers are arranged side by side, such that said valve elements reciprocatingly shift in position therethrough.

8. The hydrodynamic coupling of any of claims 3, 5 or 7, wherein both said valve element and said valve seat of both said valve means are tapered at least approximately to an acute cone, and both of these tapers narrow in the same direction in each said valve means.

9. The hydrodynamic coupling of any of claims 3, 5 or 7, wherein each said valve element has an approximately parabolic shape, viewed in longitudinal section.

10. The hydrodynamic coupling of claim 7, wherein said valve means are symmetrical.

11. The hydrodynamic coupling of claim 10, further comprising a common shaft in both said valve means chambers and said valve elements being arranged in tandem on said common shaft.

12. The hydrodynamic coupling of claim 11, wherein said valve elements taper narrower toward each other.

13. The hydrodynamic coupling of claim 11, wherein said valve elements together define a one part component.

14. The hydrodynamic coupling of claim 10, wherein said valve element has a greatest diameter end and the diameter of that said end is slightly smaller than the diameter of the bore of said valve chamber.

* * * * *